(12) United States Patent
Thorsell et al.

(10) Patent No.: US 12,153,985 B2
(45) Date of Patent: Nov. 26, 2024

(54) WIRELESS IDENTIFICATION TAGS FOR ROTATABLE WORK TOOLS AND CORRESPONDING READERS

(71) Applicant: HUSQVARNA AB, Huskvarna (SE)

(72) Inventors: Fredrik Thorsell, Stockholm (SE); Ulf Petersson, Tollered (SE); Robert Nyström, Gothenburg (SE)

(73) Assignee: HUSQVARNA AB, Huskvarna (SE)

( * ) Notice: Subject to any disclaimer, the term of this patent is extended or adjusted under 35 U.S.C. 154(b) by 169 days.

(21) Appl. No.: 17/761,238

(22) PCT Filed: Sep. 19, 2019

(86) PCT No.: PCT/SE2019/050891
§ 371 (c)(1),
(2) Date: Mar. 17, 2022

(87) PCT Pub. No.: WO2021/054876
PCT Pub. Date: Mar. 25, 2021

(65) Prior Publication Data
US 2022/0366207 A1    Nov. 17, 2022

(51) Int. Cl.
*G06K 19/077* (2006.01)
*B25F 5/00* (2006.01)

(52) U.S. Cl.
CPC .......... *G06K 19/07758* (2013.01); *B25F 5/00* (2013.01); *G06K 19/07771* (2013.01)

(58) Field of Classification Search
CPC ...... B24B 23/02; G01D 9/007; G06K 7/0008; G06K 7/10158; G06K 7/10178;
(Continued)

(56) References Cited

U.S. PATENT DOCUMENTS 4,016,553 A * 4/1977 Novikoff ................ G01V 3/104
340/572.9
4,243,980 A * 1/1981 Lichtblau ........... G08B 13/2474
343/742
(Continued)

FOREIGN PATENT DOCUMENTS

CN       1251189 A       4/2000
CN       1831841 A       9/2006
(Continued)

OTHER PUBLICATIONS

International Search Report and Written Opinion for PCT Application No. PCT/SE2019/050891, dated May 28, 2020.
(Continued)

*Primary Examiner* — Stephen R Burgdorf
(74) *Attorney, Agent, or Firm* — Burr & Forman, LLP

(57) ABSTRACT

A wireless identification tag for embedding into an electrically conductive surface of a rotatable work tool, the tag comprising at least a first and a second inductive planar loop having corresponding first and second terminals, wherein the first inductive planar loop and the second inductive planar loop are arranged in relation to a common plane and wherein the first inductive planar loop and the second inductive planar loop are arranged to cover separate areas of the common plane, where each area on the common plane is associated with a respective polarity of the magnetic flux normal to said plane.

23 Claims, 8 Drawing Sheets

(58) Field of Classification Search
CPC ........... G06K 7/10336; G06K 7/10009; G06K 19/07749; G06K 19/07758; G06K 19/07771; G06K 19/07783; H01F 38/14; H01Q 1/2216; H01Q 1/2225; H01Q 7/00; H02J 7/00036; H02J 50/005; H02J 50/02; H02J 50/10
USPC ...................................................... 340/572.1
See application file for complete search history.

(56) References Cited

U.S. PATENT DOCUMENTS

| | | | |
|---|---|---|---|
| 5,584,619 | A | 12/1996 | Guzzella |
| 5,717,139 | A | 2/1998 | Rodaway |
| 5,954,457 | A | 9/1999 | Stock et al. |
| 9,073,160 | B2 | 7/2015 | Appel et al. |
| 2001/0000960 | A1* | 5/2001 | Dettloff ............. G06K 19/0723 343/788 |
| 2004/0000974 | A1* | 1/2004 | Odenaal ............. H01F 17/006 333/219 |
| 2006/0014475 | A1 | 1/2006 | Sekiya |
| 2006/0159533 | A1 | 7/2006 | Zeiler et al. |
| 2007/0052603 | A1 | 3/2007 | Nyalamadugu |
| 2007/0199983 | A1 | 8/2007 | Thyssen et al. |
| 2007/0252718 | A1* | 11/2007 | Ray .................... G03G 21/1657 340/572.1 |
| 2009/0251330 | A1 | 10/2009 | Gerold et al. |
| 2010/0134269 | A1* | 6/2010 | Zhu ..................... B60C 23/045 340/447 |
| 2011/0266883 | A1* | 11/2011 | Eray .......................... H01Q 7/00 307/104 |
| 2012/0086556 | A1 | 4/2012 | Ikemoto |
| 2012/0138322 | A1 | 6/2012 | Neubauer et al. |
| 2012/0169472 | A1 | 7/2012 | Ikemoto |
| 2012/0212330 | A1 | 8/2012 | Halberthal et al. |
| 2013/0063277 | A1* | 3/2013 | Christiansen ......... E21B 17/006 340/854.6 |
| 2014/0070924 | A1 | 3/2014 | Wenger et al. |
| 2014/0320267 | A1 | 10/2014 | Weber |
| 2016/0217364 | A1 | 7/2016 | Ronneberger et al. |
| 2017/0129089 | A1 | 5/2017 | Manschitz et al. |
| 2019/0099859 | A1 | 4/2019 | Jayaram et al. |
| 2022/0052559 | A1* | 2/2022 | Hameed ................. H02J 50/12 |

FOREIGN PATENT DOCUMENTS

| | | |
|---|---|---|
| CN | 1963837 A | 5/2007 |
| CN | 101335377 A | 12/2008 |
| CN | 101965750 A | 2/2011 |
| CN | 105009014 A | 10/2015 |
| CN | 105940314 A | 9/2016 |
| CN | 107077586 A | 8/2017 |
| CN | 107077587 A | 8/2017 |
| CN | 107077632 A | 8/2017 |
| CN | 107766906 A | 3/2018 |
| DE | 102006008395 A1 | 8/2007 |
| EP | 1746530 A1 | 1/2007 |
| EP | 2460623 A2 | 6/2012 |
| JP | 2004126750 A * | 4/2004 |
| WO | 2015036519 A1 | 3/2015 |

OTHER PUBLICATIONS

Scharfeld, T.A, "An Analysis of the Fundamental Constraints on Low Cost Passive Radio-Frequency Identification System Design", Massachusetts Institute of technology, Aug. 2001, 11 pages.

Swedish Search Report in Swedish Patent Application No. 1951060-1, dated May 26, 2020.

Swedish Search Report in Swedish Patent Application No. 1951061-9, dated May 29, 2020.

* cited by examiner

WIRELESS IDENTIFICATION TAGS FOR ROTATABLE WORK TOOLS AND CORRESPONDING READERS

TECHNICAL FIELD

The present disclosure relates to wireless identification tags, corresponding readers, and to systems comprising both tag and reader. The disclosed tags are particularly suitable for use with rotatable heavy-duty work tools, such as cut-off discs, core drills, and abrasive tools for use on stone, concrete, and the like.

BACKGROUND

Radio-frequency identification (RFID) technology uses electromagnetic fields to automatically identify and track tags attached to objects. The tags often contain electronically stored information such as an identification number. While active tags have a local power source (such as a battery) and may operate hundreds of meters from the RFID reader, passive tags collect energy from a nearby RFID reader's interrogating electromagnetic field and therefore has a reduced range. Unlike a barcode, the tag need not be within line of sight of the reader, so it may be embedded in the tracked object.

RFID tags are used in many industries. For example, an RFID tag attached to a work tool such as a cut-off disc can be used to identify the type of disc attached to the tool.

EP 2 460 623 A2 discloses an example use of RFID technology with rotatable work tools.

Embedding wireless identification tags into metallic objects, such as a cut-off disc, is problematic since the high electrical conductivity of the metal surrounding the hole in which the tag is placed generates opposing magnetic flux that cancels out the magnetic flux through the hole. This effect, described by the Maxwell-Faraday equation, complicates interacting with the tag by a reader.

There is a need for improved wireless identification tag systems suitable for embedding into electrically conductive surfaces, such as a metal work tool.

SUMMARY

It is an object of the present disclosure to provide wireless identification tags, readers, and systems where the tags are suitable for embedding into electrically conductive surfaces. This object is at least in part obtained by a wireless identification tag for embedding into an electrically conductive surface of a rotatable work tool. The tag comprises at least a first and a second inductive planar loop having corresponding first and second terminals. The first inductive planar loop and the second inductive planar loop are arranged in relation to a common plane. The first inductive planar loop and the second inductive planar loop are also arranged to cover different areas of the common plane, where each area on the common plane is associated with a respective polarity of the magnetic flux normal to said plane.

This way the wireless tag is not 'quenched' by the electrically conductive surface. Rather, the tag is matched to a magnetic flux with varying polarity. Consequently, there is provided a wireless identification tag suitable for embedding into electrically conductive surfaces.

The rotatable work tool may, e.g., be a cut-off disc or a drill, such as a core drill.

According to aspects, the areas are separable by a line drawn on the common plane or by an arc of a circle having a radius drawn on the common plane. This approach to separation is particularly suitable for rotatable work tools.

According to aspects, the wireless identification tag comprises three or more inductive planar loops, wherein each inductive planar loop is arranged to cover a different area of the common plane, where each area is associated with a respective polarity of the magnetic flux normal to said plane. This way a wide variety of geometries can be used when embedding the tag into the electrically conductive surface. A tag thus matched to a magnetic field with varying flux polarity provides improved performance in terms of both inductive coupling and communication ability with respect to a tag reader.

According to aspects, the wireless identification tag comprises a connecting network configured to serially connect the first and the second inductive planar loops, thereby increasing a total voltage induced by the first and the second inductive planar loop in response to changes in a magnetic flux. This improves wireless identification tag communication range and energy transfer ability with respect to the reader, which is an advantage. Also, the physical footprint of the tag can be reduced since the efficiency is increased, which is an advantage.

According to aspects, the wireless identification tag comprises a connecting network configured to connect the first and the second inductive planar loops in parallel, thereby reducing a source resistance associated with the wireless identification tag. A reduced source resistance may be advantageous in certain applications.

According to aspects, the wireless identification tag comprises an identification circuit connected to the first inductive planar loop and to the second inductive planar loop. The identification circuit is arranged to modulate a load on the terminals of a circuit formed by the connection of the first inductive planar loop and the second inductive planar loop, thereby providing an inductive communication channel to a wireless identification tag reader. This way a wireless identification tag system is formed that allows communication between the tag and a corresponding tag reader in an efficient manner.

According to aspects, the identification circuit is arranged to be powered via the first and second inductive planar loops. By powering the identification circuit via the inductive loops, there is no need for a dedicated power source on the tag, such as a battery or the like, which is an advantage.

According to aspects, the identification circuit is arranged to store identification data. This enables, e.g., detecting what type of tool that is currently in use, and verifying that the tool is the correct one for the present application. The identification data also simplifies inventory management and the like.

According to aspects, the identification circuit is arranged to determine a temperature value. This enables an operator to read out temperature data and to, e.g., determine if a tool has been subject to overheating or the like. Also, overheating may be detected during tool use and a warning signal may be issued to the operator who may cease operation.

According to aspects, the identification circuit is arranged to determine an acceleration value. By determining acceleration value, a plurality of applications is enabled, which applications will be discussed in the following.

According to some other aspects, the identification circuit is arranged to receive data from the wireless identification tag reader, and to store the data. This enables, e.g., the reader, or a control unit connected to the reader, to measure operating time for a given tool, and to update an operating time parameter of the tool. A user can then read out the operating time parameter and thereby obtain information about how long a given tool has been used. The reader and/or control unit may also determine one or more operating conditions and store this information in the tool, by the identification circuit. The operating conditions may, e.g., comprise a user identity or authorization code, a time of day, a day of the week, and the like.

There are also disclosed herein wireless identification tag readers, wireless identification tag systems, blade guards, work tools and applications associated with at least some of the above-mentioned advantages. There is furthermore disclosed herein control units, computer programs, computer readable media, computer program products, and vehicles associated with the above discussed advantages.

There is furthermore disclosed herein a wireless identification tag for embedding into a rotatable work tool. The tag comprises at least a first inductive loop, an energy storage device, processing circuitry, and a radio frequency transceiver. The wireless identification tag is arranged to harvest electrical energy from a time varying magnetic flux by the first inductive planar loop and to store the electrical energy in the energy storage device. The processing circuitry and the radio frequency transceiver are arranged to be powered by the energy storage device. The energy storage device may, e.g., be a capacitor or a battery.

Thus, advantageously, there is no need for battery replacement or other external power source in the tag, since the tag harvests energy for its operation from the time varying magnetic flux. This time varying magnetic flux may be obtained, e.g., by arranging one or more permanent magnets along a rotational path of the wireless identification tag, e.g., in connection to a blade guard or the like. The radio frequency transceiver allows for wireless linkage between the tag an, e.g., a control unit, thereby avoiding complicated and costly wiring comprising a dedicated wireless tag reader.

The wireless identification tag may further comprise the identification circuit discussed above; in which case the identification circuit can be communicatively coupled to an exterior unit via the radio frequency transceiver. The identification circuit application discussed above are therefore enabled also here.

A blade guard comprising one or more permanent magnets arranged to power a wireless identification tag arranged embedded in a rotatable work tool is also disclosed herein. The permanent magnets may be arranged in relation to a circular arc centered at a rotational center of the rotatable work tool. The permanent magnets may be arranged with alternating polarity along the circular arc.

There is furthermore disclosed herein construction equipment comprising a wireless identification tag, a blade guard, and a control unit arranged to communicate with the wireless identification tag via radio link.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1:
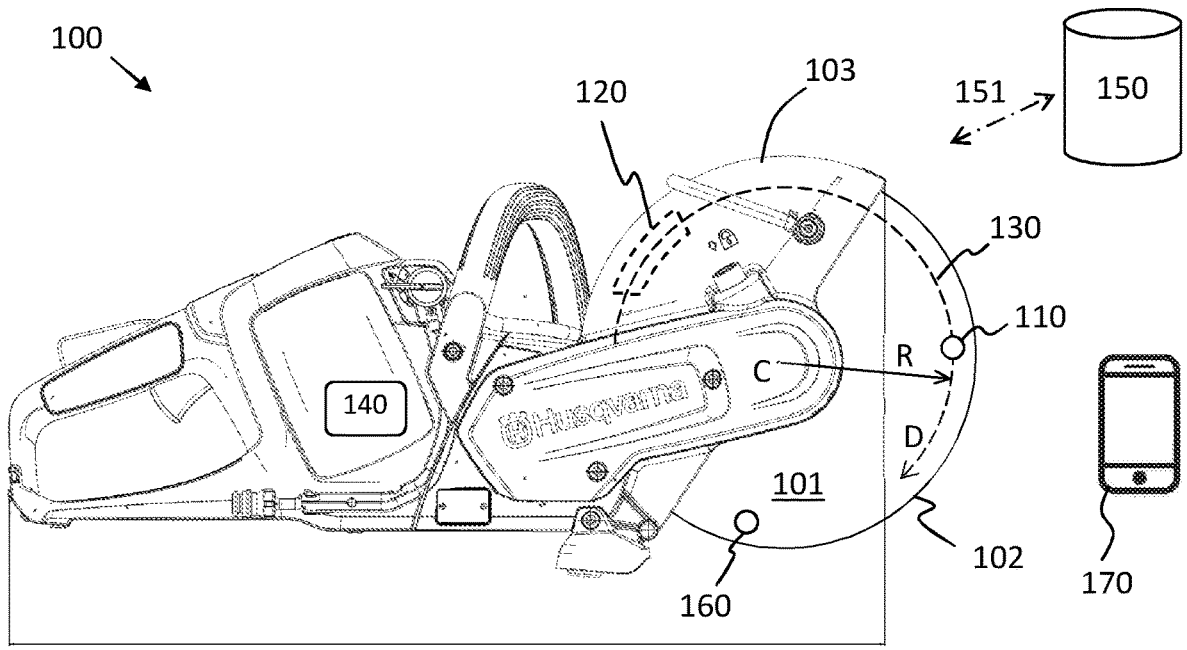
FIG. 1 shows an example work tool.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 shows construction equipment 100 for cutting hard materials such as concrete and stone by a work tool 102, here exemplified by a cut-off disc.

The work tool 102 may be in the form of a blade, such as a diamond blade comprising cutting segments with diamonds arranged along a periphery of the blade.

Figure 14:
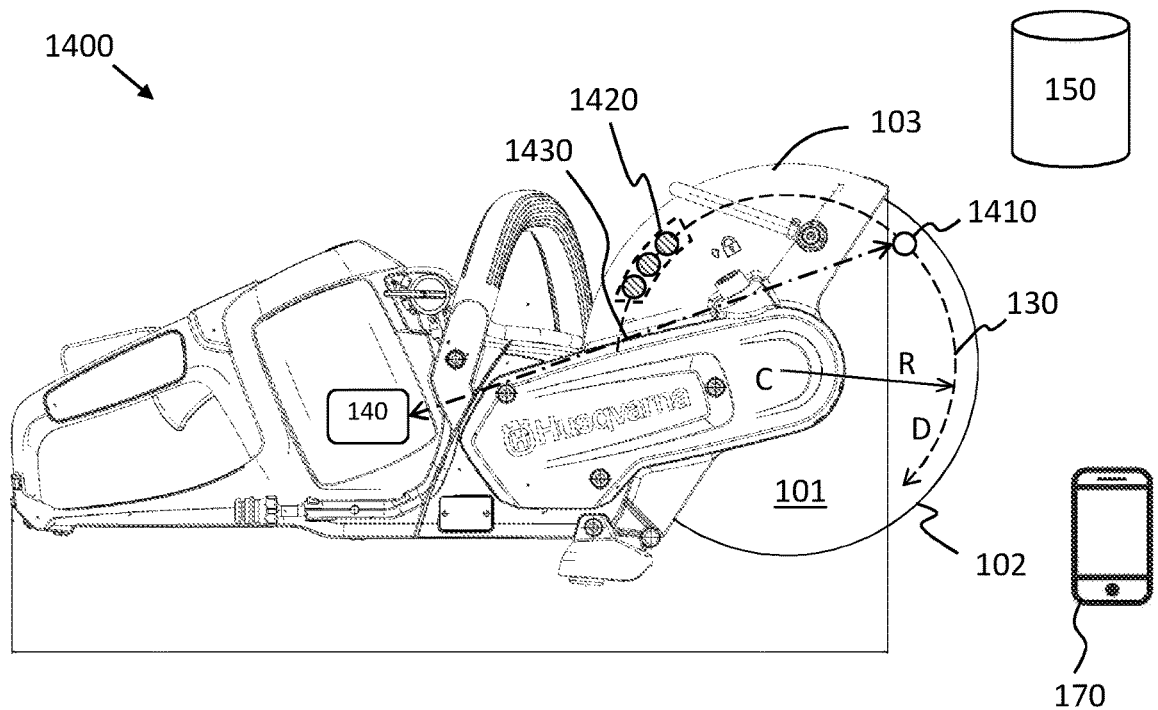
FIG. 14 shows an example work tool.
Figure 16:
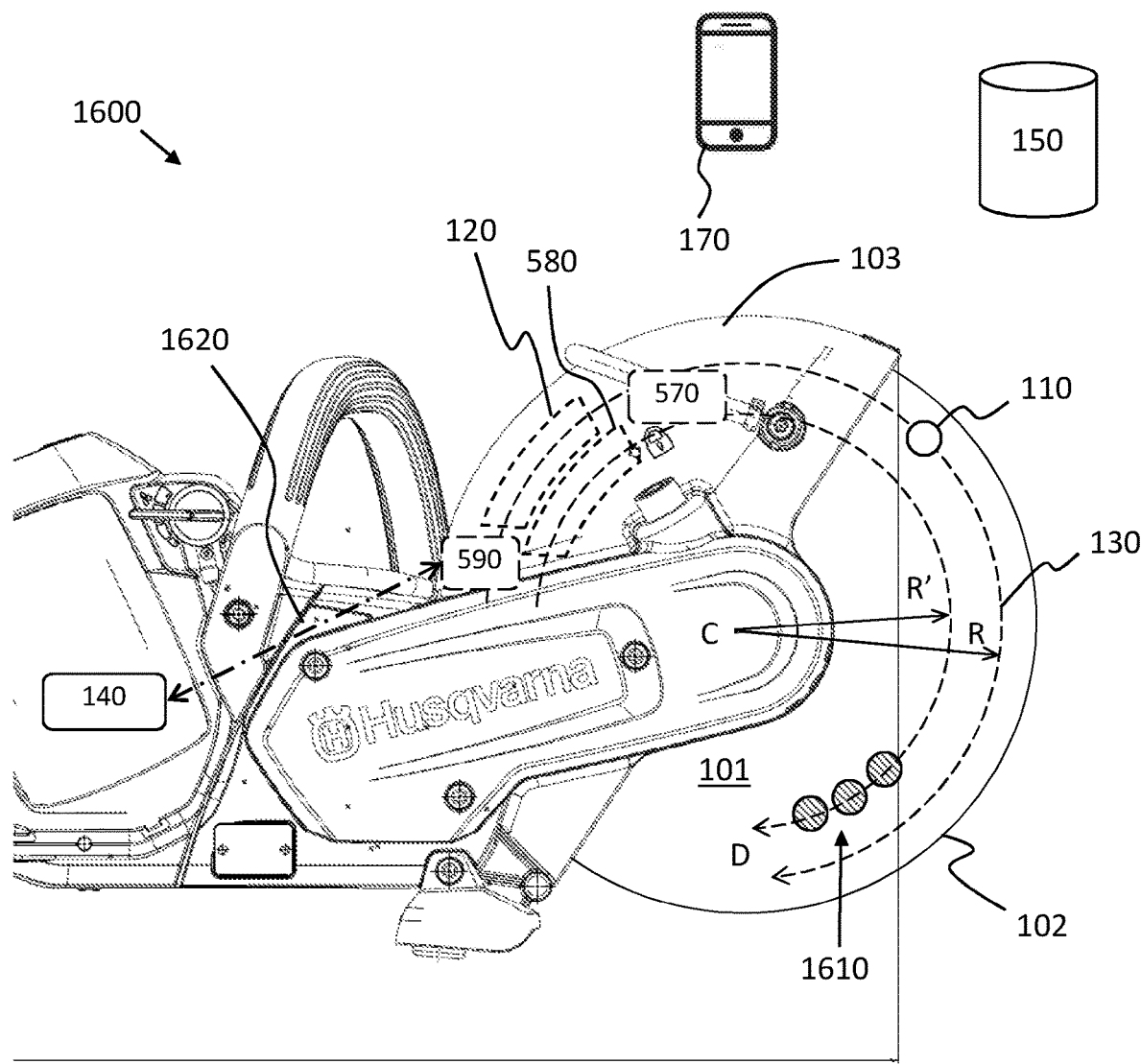
FIG. 16 shows an example work tool.

The tool 102 is made of metal, which means that its surface 101 is electrically conductive. The work tool 102 rotates in direction D about a center of rotation C. The direction D is shown as a 'down-cut' direction in FIG. 1, however, 'up-cut' operation where the work tool 102 rotates in the opposite direction is also possible. FIGS. 14 and 16 show similar equipment 1400, 1600.

Construction equipment 100, 1400, 1600 such as the cut-off tool shown in FIGS. 1 and 14, 16 are known in general and will not be discussed in more detail herein.

With reference to FIGS. 1 and 16, the work tool 102 comprises a wireless identification tag 110 arranged embedded into the electrically conductive surface 101. The wireless identification tag 110 may be embedded in a circular hole cut in the surface 101. The circular hole may be a laser-cut hole extending through the work tool 102. Alternatively, the wireless identification tag may be embedded in a recess formed in the work tool, i.e., not a hole though the tool.

The tag 110 is arranged at a radial distance R from a center of rotation C of the work tool, which means that it will move along a circular arc 130 with radius R when the work tool 102 is in use.

The tag 110 is preferably arranged at a radial distance R below two thirds of the radius of the work tool 102. For instance, if the radius of the work tool 102 is 17.5 cm, then the tag 110 should preferably be placed at a radial distance below 11 cm.

According to aspects, the tag 110 is preferably arranged at a radial distance R above one third of the radius of the work tool 102.

Placing the tag too close to the edge of the rotatable work tool may cause the tag to overheat. However, some measurements of, e.g., tool temperature are more accurate if obtained close to the edge.

The larger the radial distance R the larger the rotational velocity, meaning that less time is available for powering and reading the tag 110 by the reader 120.

Preferably, the wireless identification tag 110 is arranged away from a blade tensioning zone.

FIG. 14 also shows a work tool 102 comprising a wireless identification tag 1410. The two tags 110, 1410 differ in the way they are supplied with electrical energy and in how data stored on the tag is accessed, as will be made clear below where FIG. 14 is discussed in more detail. Other than the differences in how the tags are powered and in how data is read out from the tags, they are similar and support the same type of applications. In particular, the two tags 110, 1410 can be used for the same purposes with the same technical effects and are therefore associated with the same advantages. In particular, the identification circuits and applications discussed below can be implemented on any of the wireless identification tags 110, 1410 discussed herein.

Consequently, there is disclosed herein a work tool 102, wherein a wireless identification tag 110, 1410 is configured to rotate about a center of rotation C during operation of the work tool.

With reference to FIG. 1, each revolution of the work tool 102, the wireless identification tag 110 passes a wireless identification tag reader 120 arranged on a blade guard 103 of the construction equipment 100. The reader 120 is aligned with the tag 110 in the sense that it is arranged on the circular arc 130 at the same radial distance R from the center of rotation C as the tag, such that the tag passes more or less directly under the reader each revolution. The construction equipment discussed herein may be hand-held construction equipment or other types of construction equipment, including more heavy types of machinery such as floor saws, floor grinders, and the like. The rotatable work tool 102 may, e.g., be a cut-off disc or a drill, such as a core drill. It is appreciated that the wireless identification tags, readers, and systems discussed herein are applicable to a wide range of work tools, not just rotatable work tools.

FIG. 1 also shows a separate reader device 170 which may be in the form of, e.g., a smartphone, a tablet, or the like. The separate reader device 170 may be used to interface with the wireless identification tag 110 to, e.g., read out data from the tag or to write data onto a tag memory. The separate reader device 170 may also be used to configure the wireless identification tag 110.

FIG. 16 shows a work tool 1600 similar to the work tool in FIG. 1. However, in FIG. 16, the reader 120 is connected to a separate charging circuit 580 configured to harvest energy from one or more permanent magnets 1610 arranged on the work tool 102. The harvested energy may then be stored in an energy storage device 570 such as a rechargeable battery. The one or more permanent magnets 1610 are arranged at a radial distance R' from a center of rotation C of the work tool 102. The radial distance R' is preferably different from the radial distance R so as to not interfere with the tag-reader inductive connection. However, the reader 120 may be arranged to detect passage of the one or more permanent magnets in order to, e.g., synchronize reader operation. This is possible since there will be a fixed time duration between the permanent magnets 1610 passing the reader 120 and the wireless tag 110 passing the reader.

The reader 120 in FIG. 16 is optionally arranged to communicate with a control unit 140 via wireless link 1620 by a radio frequency transceiver 590. The reader may also communicate with the remote server 150, and perhaps also with the separate reader device 170 configured to read out data from the system. The separate reader device 170 may be comprised in, e.g., a smartphone, tablet or the like.

Figure 5:
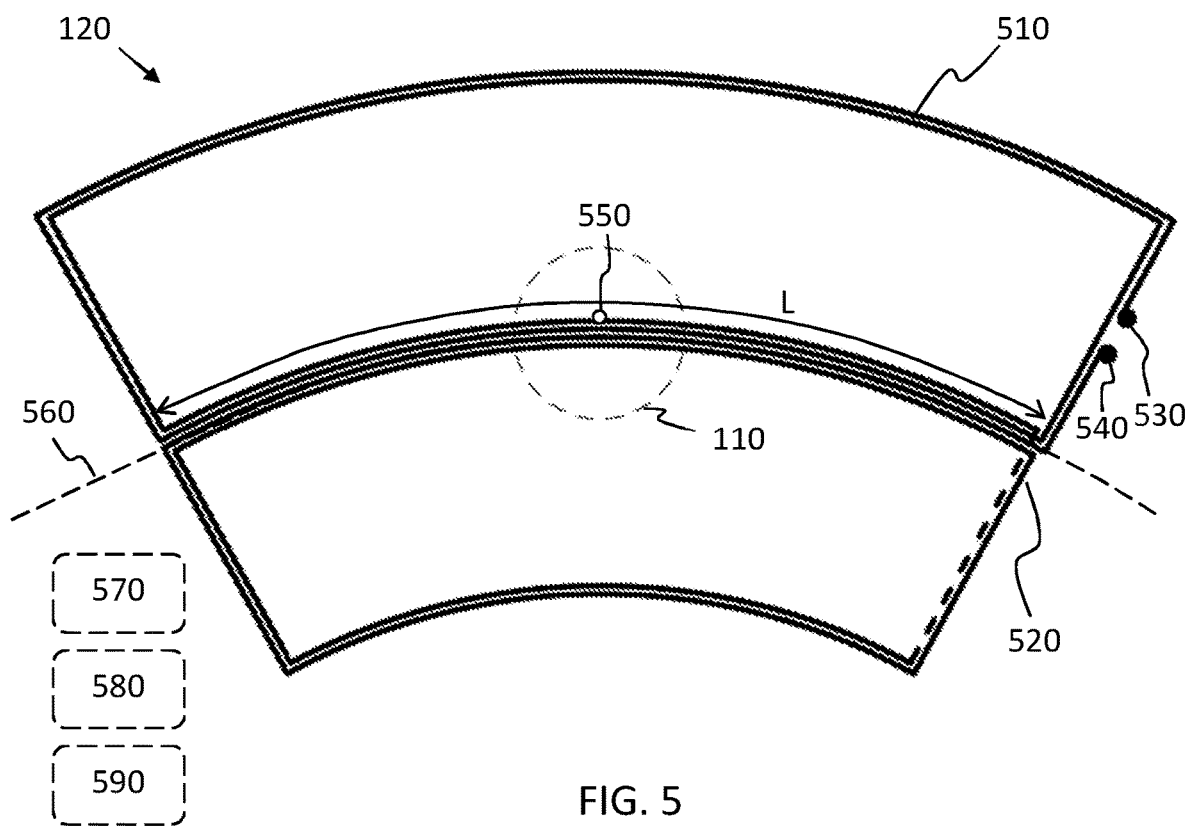
FIG. 5 shows an example wireless identification tag reader.

According to an example, a diameter Q of the wireless identification tag 110 is between 10-20 mm, and preferably about 15 mm. The radial length L of the reader 120 approximately mid-point as indicated in FIG. 5 is between 50-100 mm, and preferably about 80 mm, corresponding to one radian at the mounted radial distance from the center C.

The wireless identification tag 110 and the wireless identification tag reader 120 are comprised in a wireless identification tag system that enables functions such as identifying the type of work tool 102 attached to the construction equipment 100, and gathering data about tool use in the tag, which data can then be wirelessly accessed by the reader 120, and fed, e.g., to a control unit 140 in the construction equipment 100 or to a remote server 150. Several different applications where the wireless identification tag system 110, 120 can be used will be described below. For instance, sensors such as inertial measurement units (IMU), temperature sensors, shock sensors, and vibration sensors can be arranged in connection to the wireless identification tag 110, and data from these sensors can be accessed via the reader 120.

According to some aspects, the control unit 140 is communicatively coupled to the remote server 150 via wireless link 151.

The remote server 150 may, e.g., be configured for fleet management of a collection of work tools 100. The remote server may keep inventory based on wireless identification tag 110 identifier data and monitor the tools in the inventory based on sensor output from the tags 110. A number of applications involving the wireless identification tag 110, 1410 the reader 120, 1420 and the remote server 150 will be discussed below.

Some RFID technologies use electromagnetic induction between two loop antennas located within each other's near field, effectively forming an air-core transformer, for communication. Such systems often operate within the globally available and unlicensed radio frequency ISM band around 13.56 MHz. Theoretical working distance with compact standard antennas is up to 20 cm but the practical working distance is about 10 cm. In a passive mode of operation, an initiator device provides a carrier field and a target device answers by modulating the existing field. In this mode, the target device may draw its operating power from the initiator-provided magnetic field, thus effectively making the target device a transponder. The target device corresponds here to the wireless identification tag 110 and the initiator device corresponds to the wireless identification tag reader 120.

The present system 110, 120 may operate according to this electromagnetic induction principle of communication, thus, as the tag 110 passes under the reader 120, the two come into range of each other for a short time duration. The tag is the first powered up, drawing energy from the reader via the inductive coupling, and then modulates the field in order to transfer information to the reader, such as an identification number or other data. This type of communication is known in general and will therefore not be discussed in more detail herein.

In physics, specifically electromagnetism, the magnetic flux through a surface is the surface integral of the normal component of the magnetic flux passing through that surface. The SI unit of magnetic flux is the weber (Wb), and the Centimetre-Gram-Second (CGS) unit is the Maxwell. Magnetic flux is usually measured with a known flux-meter, which contains measuring coils and electronics, that evaluates the change of voltage in the measuring coils to calculate the measurement of time varying magnetic flux.

Figure 7A:
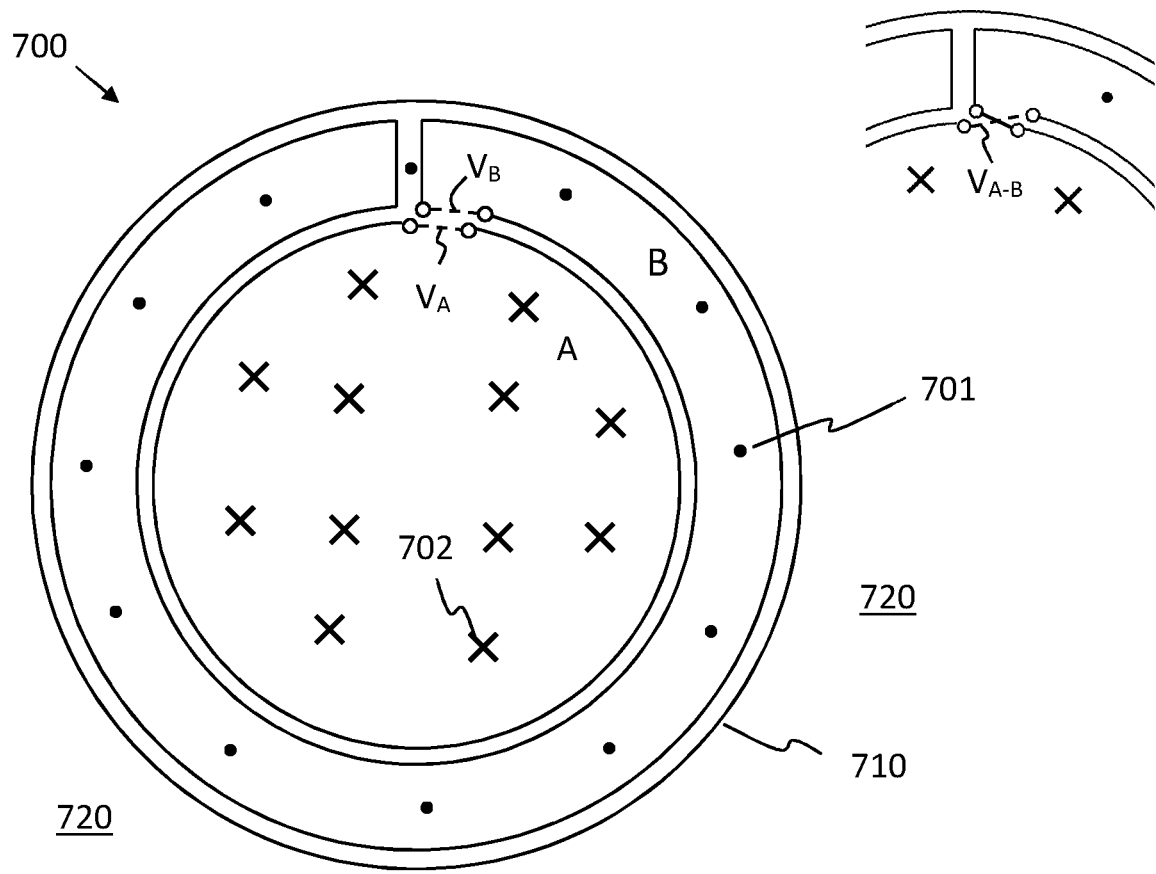
FIGS. 7-9 show example holes in an electrically conductive surface.

With reference to FIG. 7A, RFID tags operating according to the induction principle of communication described above is hampered, or quenched, by nearby electrically conductive surfaces 720. For a perfect electrical conductor with a hole or aperture 700 enclosed by the surface 720, the total magnetic flux through the hole will always be constant. This is a direct effect of the Maxwell-Faraday equation:

$$\oint \vec{E} dl = \frac{\partial}{\partial t} \int \int \vec{B} dS$$

The closed line integral along the edge 710 of the aperture 700 will be zero because there cannot exist an electric field in a perfect conductor. This means that the change in total flux through the hole over time also is zero. I.e., if the magnetic flux through the hole was zero at one point in time it will always be zero.

Note in FIG. 7A how (assuming a homogenous applied field) the normal component of the flux ($\vec{B} \cdot \vec{e}_z$) is inverted close to the edge of the circular hole 700. I.e. a tag 110 with a coil antenna along the very edge of the hole would have zero net flux.

$$\frac{\partial}{\partial t} \int \int \vec{B} \cdot e_z dS = 0$$

However, a smaller coil centred in the hole would have a net flux which would give an induced $\vec{E}$-field. This finding suggests that there is an optimum size of the tag antenna in relation to the diameter of the hole, as clearly the total flux goes towards zero when the surface area of the Tag S→0.

With reference to FIG. 7A, consider now a magnetic flux inside the perimeter 710 of the hole 700 that is inverted along the edge of the hole. Inside the hole two open loops are placed, an inner loop denoted A and an outer loop denoted B.

Herein, in line with convention, a dot 701 represents a vector going outwards while a cross 702 represents a vector in the opposite direction, i.e., going inwards. The dot schematically 701 shows an arrow approaching a viewer while the cross schematically illustrates an arrow 702 seen moving away from the viewer.

The voltage $V_A$ is the voltage induced in loop A and the voltage $V_B$ is the voltage induced in loop B. Connecting the loops A and B in series so that $V_{AB}=2$ $V_A=2$ $V_B$ both the inward and outward flux through the hole is used. If more inductance is required by the tag both loop A and loop B can be made with more than one turn and the same principle applies.

Figure 7B:
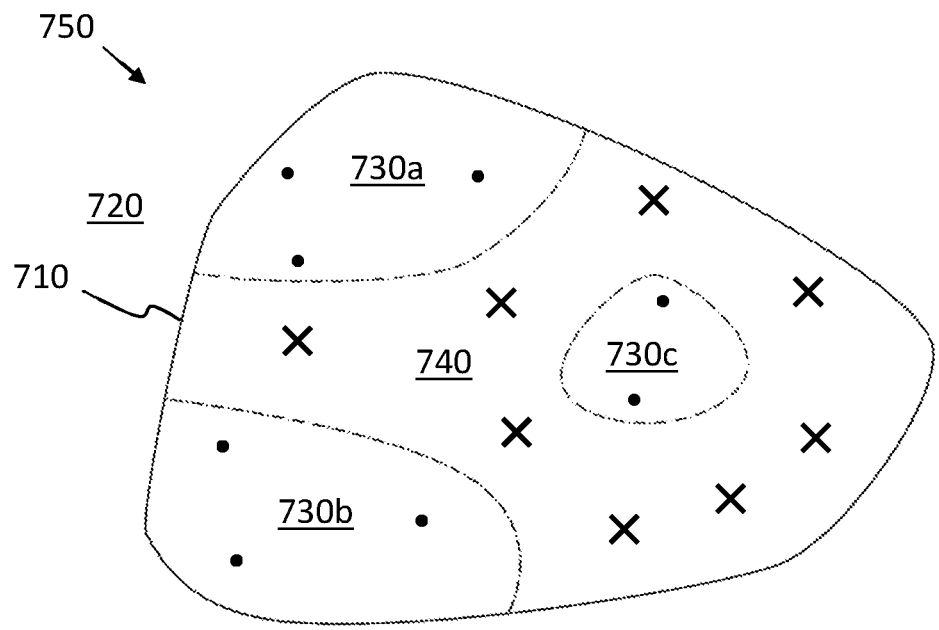

With reference to FIG. 7B, the above described principle also applies to non-circular, and non-symmetric apertures formed in electrically conductive surfaces. FIG. 7B shows an irregular hole 750 defined by a hole boundary 710. The magnetic flux has a first polarity, here shown as upwards in regions 730a, 730b, and 730c, while the rest of the aperture 740 is associated with a magnetic flux of opposite polarity, here shown as downwards.

It is appreciated that voltage and potential are relative concepts which can be measured with respect to different reference frames. The concept of induced voltage and potential is known in general and will therefore not be discussed in more detail herein.

Figures 13A, 13B:
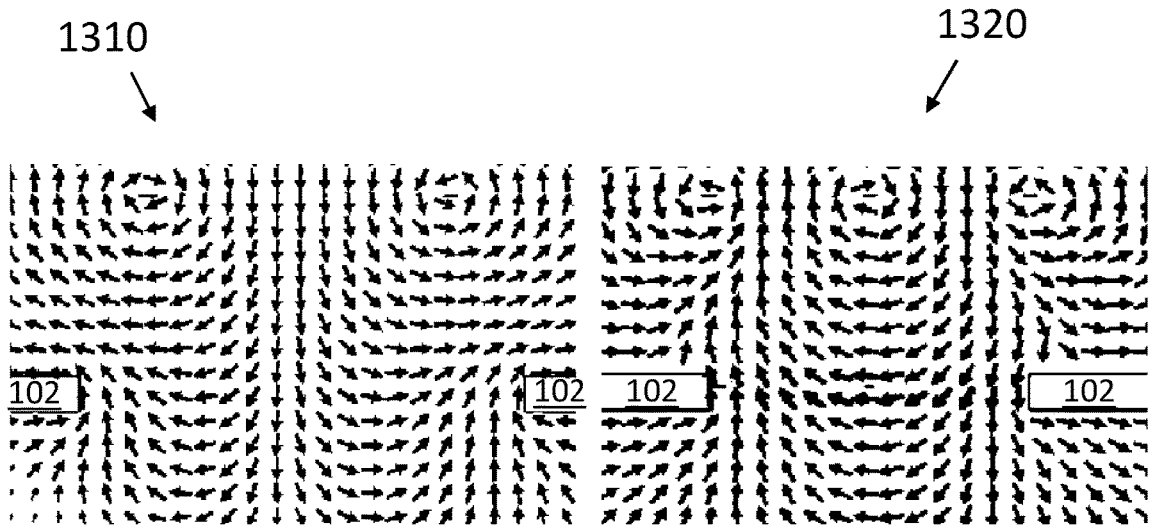
FIGS. 13A and 13B schematically illustrate magnetic flux.

FIG. 13A shows an example of magnetic flux 1310 through a hole in an electrically conductive surface where an ordinary planar single coil antenna is used. It is seen that the polarity of the flux changes close to the hole boundary. This magnetic flux 1310 is different from the magnetic flux 1320 shown in FIG. 13B resulting from use of a wireless identification tag such as the tag 110 shown in FIGS. 2 and 3.

Figure 8:
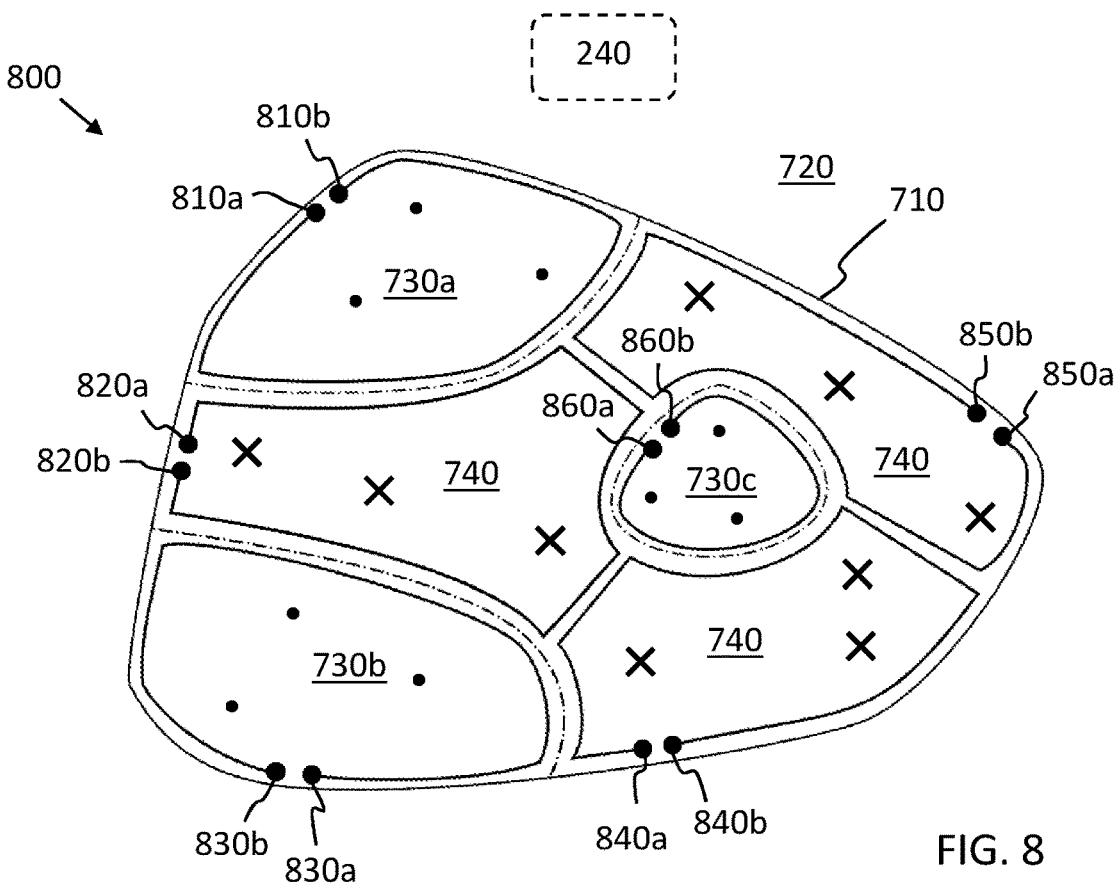

FIG. 8 shows a layout 800 of inductive planar loops arranged matched to the regions of magnetic flux with positive and negative polarity. Thus, terminals 810a and 810b generate a positive voltage $V_{AB}=V_B-V_A$, where $V_A$ is the potential at terminal 810a and $V_B$ is the potential at terminal 810b, due to the upwards magnetic flux time derivative in region 730a. In the same way; terminals 830a and 830b generate a positive voltage between them due to the upwards magnetic flux time derivative in region 730b, and terminals 860a and 860b generate a positive voltage between them due to the upwards magnetic flux time derivative in region 730c. At the same time terminals 820a and 820b, terminals 850a and 850b, and terminals 850a and 850b generate a positive voltage due to the downwards magnetic flux time derivative in region 730b. The different terminal pairs can be connected in series to increase overall voltage, or in parallel to reduce source resistance.

Figure 9:
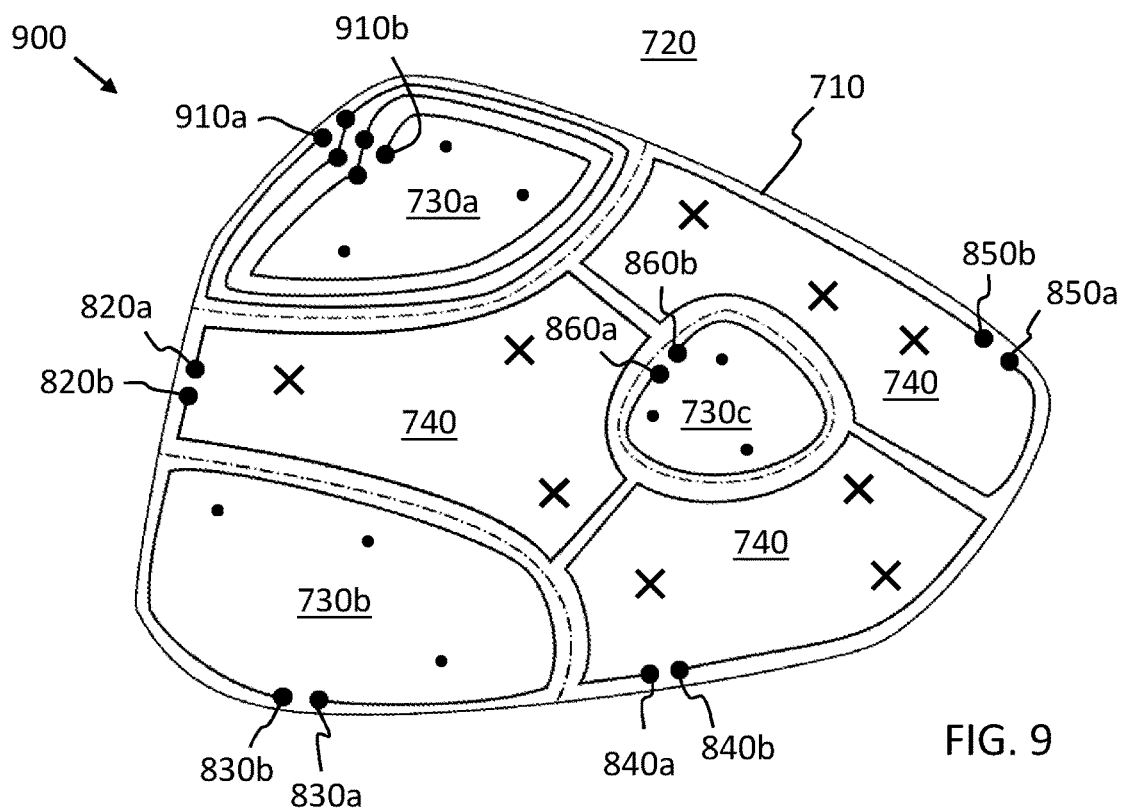

The inductive planar loops exemplified in FIG. 8 are all single turn. FIG. 9 illustrates an example 900 where one inductive planar loop is a multi-turn coil terminated by terminals 910a and 910b. A multi-turn coil may be realized as a flat spiral coil, a planar square spiral coil, a planar rectangular spiral coil, a planar hexagonal spiral coil, or an octagonal spiral coil, just to give a few examples. Notably, 'planar' does not necessarily mean that the entire coil is comprised in a plane. Rather, parts of the coil may, e.g., be arranged on different layers of a printed circuit board or the like. Thus, 'planar' should be interpreted broadly to mean any type of structure extending substantially in a plane, i.e., substantially flat, as opposed to having significant extension directions in more than two dimensions, i.e., having a volume in three dimensions.

The above described mechanisms can be exploited in order to provide an improved wireless identification tag system, as will now be described with reference to FIGS. 2-5.

Figure 2:
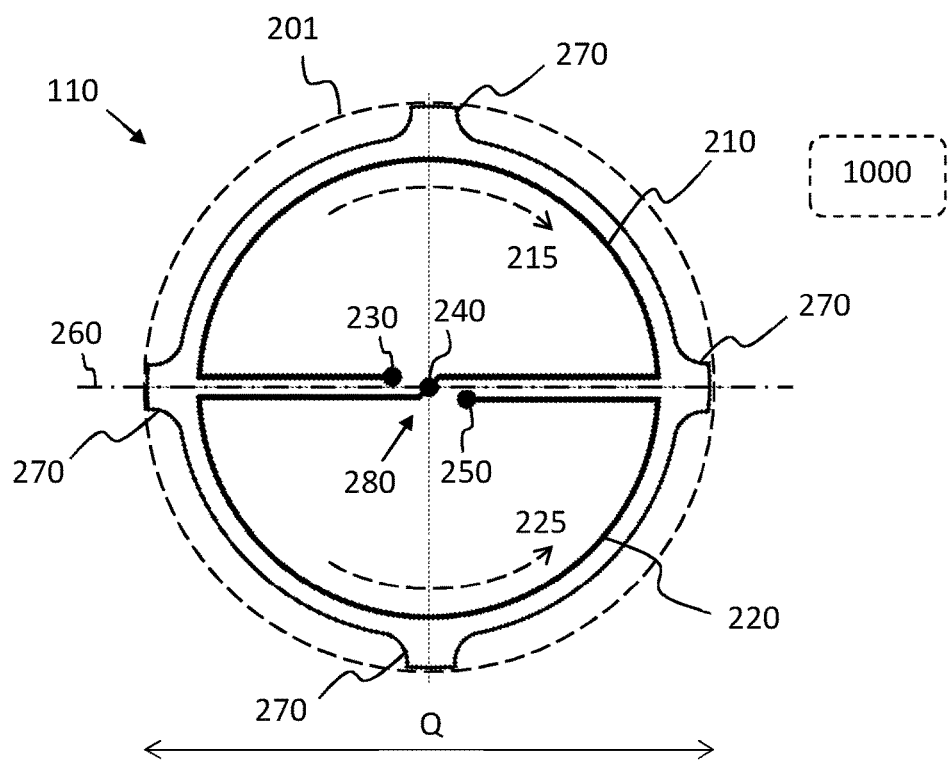
FIGS. 2-3 schematically illustrate example wireless identification tags.

FIG. 2 shows an example wireless identification tag 110 for embedding into an electrically conductive surface 101 of a rotatable work tool 102 such as the work tool shown in FIG. 1.

The tag comprising at least a first 210 and a second 220 inductive planar loop having respective first and second terminals 230, 240, 250. The inductive planar loops in the example of FIG. 2 are connected in series and therefore share a common terminal 240. Thus, according to aspects, a terminal like the terminal 240 may just be a continuing wire that extends from a planar loop into another planar loop without interruption. The first loop 210 is directed in a clockwise direction 215. The second loop 220 is instead directed in a counterclockwise direction 225, i.e., in an opposite direction compared to the first loop. Thus, by connecting the loops by the common terminal 240, the two loops become connected in series with respect to an induced voltage at the terminals of the loops.

The first inductive planar loop 210 and the second inductive planar loop 220 are arranged in relation to a common plane, e.g., parallel to the common plane. Notably, connecting to the discussion above on regions with different magnetic flux polarity, the first inductive planar loop 210 and the second inductive planar loop 220 are arranged to cover different areas of the common plane, where each area on the common plane is associated with a respective polarity of the magnetic flux normal to said plane. The plane referred to is here a plane defining a major extension of the flat wireless identification tag, which is coined shaped in this example. According to an example, a diameter D of the wireless identification tag 110 is between 10-20 mm, and preferably about 15 mm.

The different areas may, according to some aspects, be separate areas. However, the areas may also be partly overlapping, which can be the case, e.g., if the inductive planar loops are formed on separate layers of a PCB.

Figure 4:
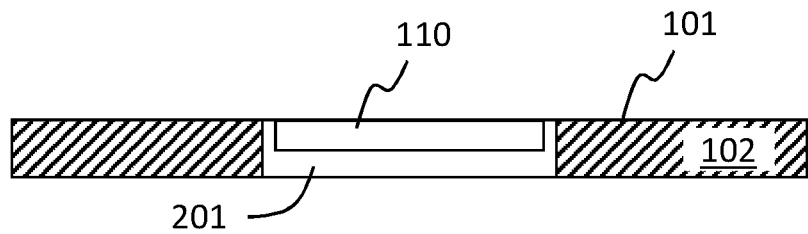
FIG. 4 illustrates a wireless identification tag embedded in a work tool.

FIG. 4 shows the wireless identification tag 110 when embedded in a hole 201 formed in an electrically conductive surface 101 of a rotatable work tool 102. The tag is preferably comprised on a piece of printed circuit board (PCB), which can be glued into a hole formed in the work tool 102.

With reference to FIG. 2, the wireless identification tag 110 comprises protruding portions 270 configured to engage slots formed in the work tool, thereby aligning the tag 110 with respect to the work tool 102. The wireless identification tag shown in FIG. 2 is arranged to be embedded into the work tool 102 such that the separation line 260 forms a tangent to the circular arc 130. The protruding portions simplify assembly of the work tool 102 and the tag 110.

According to other aspects, the protruding portions 270 are configured as distance elements to space the tag 110 from the edge of the hole 201 formed in the work tool 102 to receive the tag 110. The distance elements then center the tag in the hole and allows for, e.g., glue to fill the gap between tag and hole boundary.

The tag 110 is symmetric in the sense that a symmetry line or separation line 260 separates the first 210 and the second 220 inductive planar loops. This way, the first inductive planar loop 210 will be radially outside the circular arc 130 when the tag rotates along with the work tool 102 in direction D, while the second inductive planar loop 220 will be located radially inside the circular arc 130. Notably, when the tag 110 passes under the reader 120, a center point 280 of the tag follows along the circular arc 130 each revolution. In other words, the areas are separable by a line 260 drawn on the common plane or by an arc of a circle having a radius R drawn on the common plane.

With reference to the discussion in connection to FIGS. 8-9, the tag 110 may according to some aspects comprise three or more inductive planar loops, not only two as shown in FIG. 2. Each inductive planar loop is then arranged to cover a different or separate area of the common plane, where each area is associated with a respective polarity, i.e., positive or negative, of the magnetic flux normal to said plane. It is appreciated that there are only two possible polarisations of the flux normal to a plane, namely positive and negative.

Figure 3:
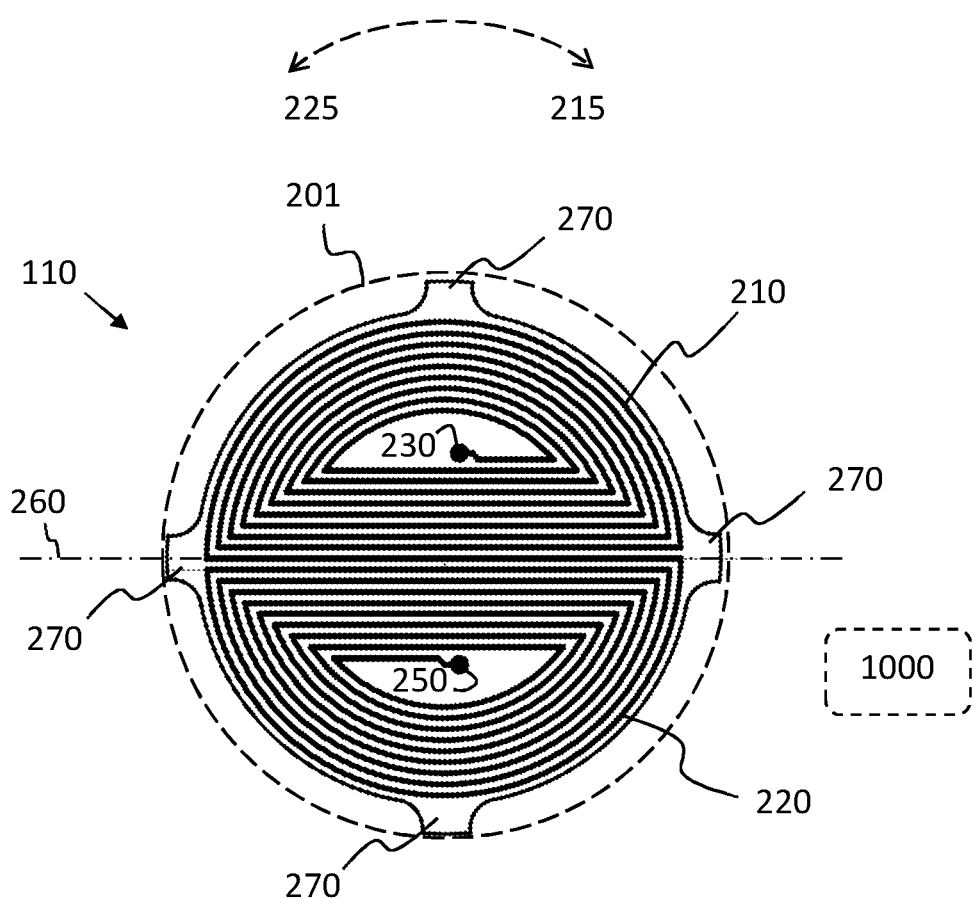

The tag 110 shown in FIG. 2 has single turn inductive planar loops. According to some aspects, at least one of the first inductive planar loop 210 and the second inductive planar loop 220 is a single turn inductive planar loop. However, one or more of the loops may also be a multiple turn inductive planar loop. An example of a wireless identification tag 110 with multiple turn indictive planar loops is shown in FIG. 3. The first loop 210 and the second 220 planar loops are multiple turn inductive planar loops arranged serially connected and in a common plane.

The two loops comprising multiple turns provide a coupling with increased induced voltage at the terminals of the tag with respect to the reader 120. In FIG. 3, the inductive planar loops are constructed by a sequence of half-moon shaped turns starting from a terminal 230, 250. The two loops are serially connected, although the connecting or common terminal corresponding to the terminal 240 in FIG. 2 is not shown in FIG. 3. The first loop 210 is directed in a counterclockwise direction. The second loop 220 is instead directed in a clockwise direction, i.e., in an opposite direction compared to the first loop.

As noted above, the wireless identification tags shown in FIGS. 2 and 3 are both arranged to be embedded into the work tool 102 such that the separation line 260 form a tangent to the circular arc 130.

FIG. 5 shows a wireless identification tag reader 120 for reading data from the wireless identification tag 110, also when the tag is embedded into an electrically conductive surface 101 of a rotatable work tool 102, the reader comprises at least a first 510 and a second 520 inductive planar loop inducing a current distribution in the surface of the rotatable work tool 102 which together with the current distribution in loop 510 and loop 520 is associated with a magnetic flux through the hole 201 shown, e.g., in FIG. 4, matched to respective first 210 and second 220 inductive planar loops on the tag 110. Each loop 510, 520 on the reader 120 has a corresponding first and second terminal 530, 540, 550, wherein the first loop 510 is arranged to generate a magnetic flux having a first flux polarity, wherein the second loop 520 is arranged to generate a magnetic flux having a second flux polarity different or opposite from the first flux polarity.

According to aspects, the first 510 and the second 520 inductive planar loop have arcuate forms corresponding to circle arcs of circles with a first and a second radius associated with the rotatable work tool 102. The length L of the arcs may be configured in dependence of the rotational speed of the work tool 102, and the time required to perform wake up and communication operations as the tag 110 passes the reader 120. According to an example, the length L is between 50-100 mm, and preferably about 80 mm.

There is also disclosed herein a wireless identification tag reader 120 for reading data from a wireless identification tag 110 embedded into an electrically conductive surface 101 of a rotatable work tool 102. The reader comprises at least one loop, of which one loop segment is positioned over a line 560 defining separation of areas with flux of opposite polarities matching the separation line 260 between areas of opposite flux polarities of the wireless identification tag loops.

With reference to FIG. 1, there is furthermore disclosed herein a blade guard 103 for a work tool 100 comprising a rotatable work tool 102, wherein the blade guard 103 comprises a wireless identification tag reader according to the above discussion.

The tag 110 and the reader 120 together form a wireless identification tag system 110, 120 comprising a wireless identification tag 110 and a wireless identification tag reader 120 for reading data from the wireless identification tag 110 when embedded into an electrically conductive surface 101 of a rotatable work tool 102, the reader 120 comprising at least one inductive planar loop 510, 520, of which at least one loop segment is positioned over a line 560 defining separation of areas with magnetic flux of opposite polarities matching a separation line 260 between areas of opposite flux polarities of inductive planar loops on the wireless identification tag.

Herein, a serial connection of two or more inductive planar loops or coils is a connection which increases overall voltage, i.e., a connection between positive and respective negative voltage terminals. It is appreciated that the relative terms positive voltage and negative voltage are defined in dependence of the direction of magnetic flux' time derivative through the inductive planar loop. Ideally, for a serial connection, the voltage induced over the new (combined) two ports of the combined loops is the sum of the voltage induced over each of the individual loops. However, losses may be incurred resulting in a combined voltage somewhat below the sum of the voltage induced over each of the individual loops. In some implementations of systems such as this, a capacitance is used to make the coil and capacitance circuit resonant which produces an even higher voltage. The capacitance can also in some systems be in series with the inductance of the antenna and then the voltage at resonance will be very low but the current high. Such implementations are known and will therefore not be discussed in more detail herein.

A parallel connection of two inductive planar loops is the opposite to a serial connection. If the serial connection connects positive terminal to negative terminal, the parallel connection connects positive to positive, or negative to negative. It is again appreciated that the relative terms positive voltage and negative voltage are defined in dependence of the direction of magnetic flux' time derivative through the inductive planar loop. Ideally, for a serial connection, the voltage induced over the new (combined) two ports of the combined loops is the same as the voltage induced over each of the individual loops if the voltages of the two loops are identical.

According to some aspects, the wireless identification tag 110 comprises a connecting network 240 configured to serially connect the first 210 and the second 220 inductive planar loops, thereby increasing a total voltage induced by the first 210 and the second 220 inductive planar loop in response to changes in a magnetic flux.

According to some other aspects, the wireless identification tag 110 comprises a connecting network 240 configured to connect the first 210 and the second 220 inductive planar loops in parallel, thereby reducing source resistance associated with the wireless identification tag 110. Source resistance is here to be interpreted in relation to the resistive element of a circuit equivalent comprising of the series connection of a Thévenin equivalent and a reactance, that electrically describes the power delivered by the planar inductive loops 210 and 220 into a load impedance when the loops are subjected to a time varying magnetic flux.

The connecting network 240 may, e.g., be just a common terminal such as in FIG. 2. However, the terminals of one or more inductive planar loops may also be connected to ports on a switch circuit comprising a connecting matrix. This connecting matrix may be arranged to permanently connect terminals in a pattern, or it can be arranged to connect terminals according to some input control signal. This way the connections between loops may be switched from a serial connection into a parallel connection depending on the control signal.

The wireless identification tag 110 may, according to some aspects, comprise an identification circuit 1000 connected to the first inductive planar loop 210 and to the second inductive planar loop 220, wherein the identification circuit 1000 is arranged to modulate a load on the terminals of the first inductive planar loop 210 and on the second inductive planar loop 220, thereby providing an inductive communication channel to a wireless identification tag reader 120. Inductive communication channels were discussed above. Such channels and methods of communication are known in general and will not be discussed in more detail herein. One example identification circuit 1000 will be discussed below in connection to FIG. 10. The identification circuit 1000 may comprise, e.g., processing circuitry, storage medium 1030, and an interface for communications 1020. The interface communicates via the inductive planar loops with the reader 120 by modulating a load on the terminals of the first inductive planar loop 210 and on the second inductive planar loop 220. There are also low frequency RFID protocols which do not use load modulation but instead has a charging time and then actively transmits once the RFID circuit has enough energy to do so.

According to some aspects, the identification circuit 1000 is arranged to be powered via the first 210 and second 220 inductive planar loops. Thus, as the wireless identification tag passes in vicinity of the reader, it draws energy from the reader which allows it to power up and start operating. Any surplus energy may be stored by a capacitor, battery, or other means for storing electrical energy.

According to some aspects, the identification circuit 1000 is arranged to store identification data. The identification data may, e.g., comprise an identification code or number which can be used to identify the type of object which the tag is attached to, or its owner. The identification data may furthermore comprise data to identify a production batch, a producer, a classification or the like.

The identification data may also store dimension data such as a rotatable work tool diameter and thickness.

The identification data may furthermore comprise data relating to intended use, i.e., an operational design regime of the tool and other tool specifications.

The dimension data and data relating to intended use may support applications that prevent erroneous use of the construction equipment.

The identification data may also comprise data relating to an owner of the tool, optionally in combination with authentication data.

The authentication data and data relating to the owner of the tool can be used to prevent unauthorized use of the construction equipment and/or of the rotatable work tool 102.

The identification circuit 1000 may furthermore be equipped or connected to various forms of sensors or actuators. For instance, a temperature sensor, arranged to determine a temperature value associated with the work tool 102, may be configured to periodically sample a temperature value associated with the work tool 102, and store the data, or some function of the data such as maximum temperature, in the storage medium 1030. The reader 120 can then be used to access the stored temperature data in order to monitor, e.g., if the work tool 102 has been subject to overheating. Temperature data in the form of temperature signatures can also be used to detect when the work tools has been worn out and needs replacement. The identification circuit 1000 can be configured to perform such detection based on the temperature data and trigger transmission of a warning signal via the reader 120.

According to other aspects, the identification circuit 1000 can be arranged to determine an acceleration value, e.g., by means of an inertial measurement unit (IMU) integrated with or connected to the identification circuit. The IMU can be configured to determine an engine speed, e.g., a rotational velocity in terms of revolutions per minute (RPM). This data can again be read out via the reader by, e.g., the control unit 140. By comparing the RPM from the IMU with the RPM from the engine control system, need for drive belt adjustment, drive belt wear and the like can be determined. It is also possible to determine the type of material being cut by analysis of the vibrations measured by the IMU. In case the work tool 102 is used to cut into a material for which it was not intended, a warning signal can be issued. Other forces and vibrations acting on the tool can also be determined and stored for later access. This way analysis can be performed on a tool to see if the tool has been subject to unusually large forces or vibrations, or mechanical impact.

A kickback condition can be detected by the IMU on the identification circuit 1000 and the event can be stored in memory. The kickback data can then form basis for further analysis.

A pre-kickback condition can also be detected by the IMU on the identification circuit 1000. A pre-kickback condition is a jerking motion by the tool which often occurs prior to kickback. The pre-kickback condition often occurs when the rotatable work tool 102 is subject to wear.

Erroneously assembled work tools give rise to vibrations which can be detected. A warning signal may be triggered in case the vibrations match some pre-determined vibration criteria.

According to some other aspects, the identification circuit 1000 is arranged to receive data from the wireless identification tag reader 120, and to store the data in a memory unit. This enables, e.g., the reader 120, or a control unit 140 connected to the reader 120, to measure operating time for a given tool, and to update an operating time parameter of the tool. A user can then read out the operating time parameter and thereby obtain information about how long a given tool has been used. For this purpose, a separate reader device 170 may be provided. This separate reader device 170 is arranged to interface with the wireless identification tag 110, to power the tag, and to read out data from the tag 110.

The reader 120 and/or control unit 140 may also determine one or more operating conditions and store this information in the tool, by the identification circuit. The operating conditions may, e.g., comprise a user identity or authorization code, a time of day, a day of the week, and the like. The separate reader device 170 can then be used to determine who has used a given tool, when, and for how long.

To summarize, with reference also to FIG. 1, the construction equipment 100 is arranged to obtain data from the wireless identification tag 110 via the reader 120, and to take action in response to the obtained data, wherein the action comprises any of; adjusting one or more operation parameters of the construction equipment, triggering an emergency routine or warning signal, and executing an authentication procedure.

Figure 6:
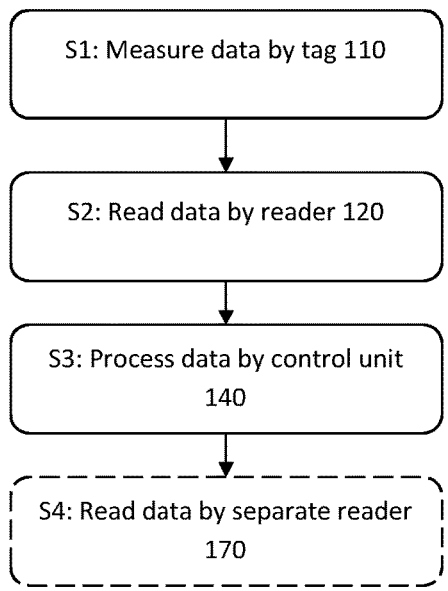
FIG. 6 is a flow chart illustrating methods.

FIG. 6 is a flow chart illustrating methods as disclosed herein. These methods comprise measuring data S1 by one or more sensor units arranged in connection to the wireless identification tag, on the work tool 102. The data is then optionally pre-processed by the identification circuit 1000, before being read out S2 by the reader 120 as the tag passes in vicinity of the reader 120. The methods also comprise processing the data by the control unit 140. Some examples of the illustrated methods have been discussed above.

The methods may also comprise reading data from the tag 110 by the separate reader device 170 discussed above.

With reference again to FIG. 1, which shows construction equipment 100 comprising a work tool 102. The work tool 102 in turn comprises an embedded wireless identification tag 110 according to the discussions above. The wireless identification tag 110 is configured to rotate about a center of rotation C during operation of the work tool.

Some types of construction equipment are very sensitive to imbalance in the work tool. A cut-off disc for instance may start to wobble and cause reduced comfort for the user in case the rotatable work tool is not correctly balanced. The hole formed in the work tool for embedding the wireless identification tag 110 will cause a slight shift in the balance of the tool, since the tag is likely of less weight than the material which has been removed. To compensate for this shift of mass, the work tool 102 may optionally comprise a balancing hole configured to compensate for a weight imbalance in the rotatable work tool 102 due to the embedded wireless identification tag 110. The balancing hole or holes may be arranged on opposite side of the work tool compared to the wireless identification tag, i.e., on the other side of the tool with respect to the center of rotation C. One or more balancing holes may be formed in the work tool 102. Alternatively, or in combination with the balancing holes, extra weights may be arranged on the work tool to balance the tool in compensation of the wireless identification tag 110.

According to some aspects, the work tool 102 comprises one or more embedded permanent magnets 160 configured in radial dependence of the embedded wireless identification tag 110. A magnet 160 may, for instance, be arranged in a balancing hole. These magnets may be used to wake up the reader, i.e., they may be arranged in front of the wireless identification tag in the rotation direction D. When they pass the reader, the reader knows the tag 110 soon follows, and it can therefore power up its systems. The reader can then go to sleep after the tag has passed, until the magnet passes again. This way the reader may conserve energy, by implementing a type of duty-cycle operation.

According to some aspects, with reference to FIGS. 1, 5 and 16, the wireless identification tag reader 120 comprises an energy storage device 570 and a charging circuit 580 arranged to harvest energy from one or more permanent magnets 160, 1610 attached to the rotatable work tool 102. The wireless identification tag reader 120 may then be at least partly powered by the energy storage device 570.

This way the reader can be energy self-supportive in that it harvests energy from the time varying magnetic flux of the permanent magnet 160 which rotates to pass the reader periodically.

According to some related aspects, the wireless identification tag reader 120 comprises a radio frequency transceiver 590 configured to transmit the data from the wireless identification tag 110 to an external entity such as the control unit 140 and/or the remote server 150. This way the need for a wired connection to, e.g., the control unit 140 is avoided, which is an advantage. An example of this type of tag will be discussed below in connection to FIG. 14.

It is appreciated that the permanent magnet 160 may have at least two different purposes, i.e., energy harvesting and circuit wake-up. One or more permanent magnets may be arranged on the rotatable work tool 102. For energy harvesting purposes, it may be advantageous to embed an array of permanent magnets with alternating polarity in order to provide an increased time varying magnetic flux experienced by the reader 120. Thus, there is disclosed herein a rotatable work tool 102 comprising one or more embedded permanent magnets 160 configured to power and/or wake up a wireless identification tag reader 120. An array of permanent magnets is preferably arranged along a circular arc with alternating polarity in order to optimize energy harvesting capability.

Figure 12:
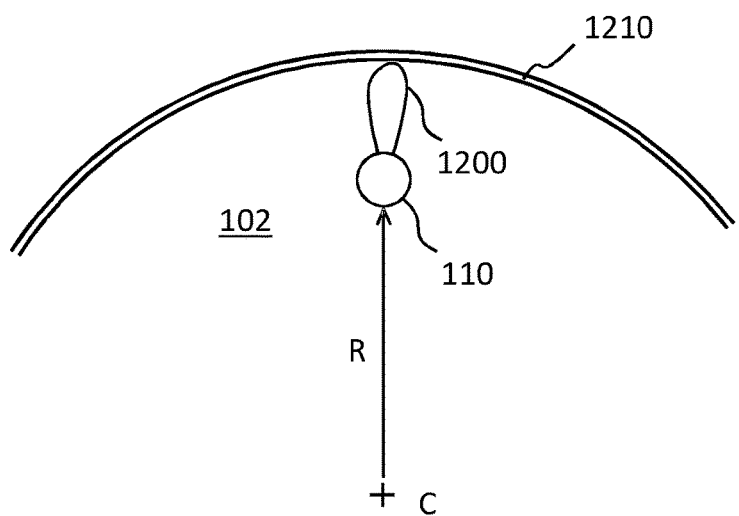
FIG. 12 schematically illustrates a work tool with an embedded tag.

With reference to FIG. 12, according to some aspects, the work tool 102 also comprises a wire 1200 extending in a loop radially outwards on the rotatable work tool 102 from the embedded wireless identification tag 110. The embedded wireless identification tag 110 is arranged to detect tool wear in case the wire loop is broken. Thus, if an abrasive portion or cutting segment 1210 of the work tool 102 is worn down, the wire gets cut, which the tag 110 can detect, e.g., by detecting the resulting open circuit. The tag 110 can then trigger a warning signal which the control unit 140 can receive via the reader 120.

Several applications may be realized by the herein disclosed identification tags, readers, and systems. These applications will now be discussed in detail. It is appreciated that the applications may be implemented separately or in combination. The applications are based on construction equipment 100 comprising a rotatable work tool 102, a wireless identification tag reader 120, and a control unit 140. The applications are also possible to realize based on the wireless identification tag 1410 and construction equipment discussed below in connection to FIGS. 14 and 16. The rotatable work tool 102 comprises a wireless identification tag 110, 1410 according to the above discussion, i.e., the tag is configured to store data configured to be accessible via the wireless identification tag reader 120 or via radio link to the control unit 140 as discussed below in connection to FIGS. 14, 15 and 16.

In some applications, as noted above, the data configured to be accessible via the reader 120 or by radio frequency link 1430 comprises identification data to identify the rotatable work tool 102. This allows for keeping track of the rotatable work tool 102 by, e.g., defining a digital twin associated with the rotatable work tool. For instance, the digital twin may comprise data related to tool specification, intended use domain, dimensions, and the like. The digital twin may also comprise information associated with an owner of the tool.

In some other applications, the data configured to be accessible via the reader 120 or by radio frequency link 1430 comprises authentication data to authenticate the rotatable work tool 102 against the control unit 140. The authentication data can be used to, e.g., ensure that only the intended tool is possible to use with a given piece of construction equipment. In case some other tool is attached to the equipment, the equipment can be prevented from operating by, e.g., disabling the power source or the like. A rental company, fleet operator, or the like, can thereby assure that a machine is only operated with certain rotatable work tools 102.

The data configured to be accessible via the reader 120 or by radio frequency link 1430 optionally also comprises tool specification data associated with the rotatable work tool 102. This way a given machine can be pre-configured to only accept tools complying with some range of specifications. For instance, a machine may only be possible to start if the specification of the rotatable work tool meets some predetermined criteria. If the rotatable work tool does not meet the criteria, operation can be prevented and/or a warning signal can be triggered.

The data configured to be accessible via the reader 120 or by radio frequency link 1430 may also comprise tool dimension data associated with the rotatable work tool 102. A machine can be configured to only accept tools having certain pre-defined dimensions. If a tool not complying the requirements on dimension is attached to a given piece of construction equipment, operation can be prevented, or a warning signal can be triggered. This also applies to the interface between tool and machine. If the two are not in compliance, operation can be prevented and/or a warning signal triggered.

The wireless identification tag 110, 1410 optionally comprises a temperature sensor arranged to determine and to store a temperature value associated with the rotatable work tool 102. This allows the construction equipment to monitor tool temperature and thereby, e.g., prevent tool overheating. If the reported temperature from the wireless identification tag goes above a predetermined threshold level, then the machine can be stopped, a warning signal can be triggered, or the rotational velocity decreased. Cooling water flow can also be controlled in dependence of the reported tool temperature, i.e., the construction equipment 100 is optionally arranged to regulate a flow of water for cooling the rotatable work tool 102 based on a temperature sensor reading from the wireless identification tag 110.

The wireless identification tag 110, 1410 may further comprise a first and a second temperature sensor, arranged radially from each other on the rotatable work tool 102, wherein the first and second temperature sensor is arranged to determine a radial temperature gradient associated with the rotatable work tool 102. This way a more refined control based on tool temperature is enabled. By knowing the temperature gradient and the radial location R of the tag, a temperature on the perimeter of the tool, close to abrasive or cutting elements, can be determined by extrapolating the temperature gradient from the location of the tag.

As noted above, the reader 120 and/or control unit 140 may store data in the tag comprising information related to who has used the tool, when, and for how long. This data can then be used for setting service intervals and determining when a rotatable work tool 102 should be replaced. It may be advantageous to let the reader 120 and/or the control unit 140 measure operating time, since the wireless identification tag 110 may be sleeping for large portions of the operating time, and can therefore not easily measure time by, e.g., a timer or a clock.

Nevertheless, the wireless identification tag 110, 1410 optionally comprises a timer or clock configured to determine and to store an operating time associated with the rotatable work tool 102. This allows the control unit and/or the remote server 150 to monitor how long a tool is used. This data can then be used for setting service intervals and determining when a rotatable work tool 102 should be replaced.

The wireless identification tag 110, 1410 optionally comprises an inertial measurement unit (IMU). IMUs were discussed above. The IMU may be configured to monitor a vibration signature of the rotatable work tool 102, and to detect any of; crack formation in the tool, blade core skew or unevenness, blade wear, and tool glazing or occurrence of polished diamonds, based on the vibration signature.

A vibration signature is a time sequence of vibration which can be used to identify various conditions. For instance, crack formation in the rotatable work tool gives rise to a characteristic vibration pattern which can be detected by the IMU by comparing the measured vibration to a set of pre-defined vibration patterns in terms of, e.g., waveform shape of frequency characteristics. Blade core skew or unevenness, blade wear, and tool glazing or occurrence of polished diamonds also give rise to characteristic vibration patterns or signatures which can be detected by the IMU. The detection may be based on an artificial neural network trained to recognize various types of vibration signatures.

Other applications comprise the IMU being configured to monitor rotatable work tool 102 jerk, and to detect a kickback condition and/or a pre kickback condition based on the monitored tool jerk. Kickback conditions are associated with rapid acceleration in certain directions. Kickback is often preceded by one or more pre-kickback events, which are minor kickbacks or jerking motions by the tool. An IMU can be trained by, e.g., artificial neural network or otherwise configured to recognize such pre-kickback events and to trigger a warning signal or even prevent further use of the tool until it has been serviced, e.g., by replacement or re-tipping of the rotatable work tool 102.

Some more advanced applications are built on a construction equipment system 100, 150 comprising the construction equipment 100 discussed herein and the remote server 150. The remote server 150 is communicatively coupled 151 with the control unit 140 and configured to access data stored by the wireless identification tag 110, 1410.

In some such applications the remote server 150 and/or the control unit 140 is arranged to determine a cost per use associated with the construction equipment 100. The cost per use can be determined based on, e.g., estimated tool wear, tool use time, and on how the tool has been used, e.g., if challenging materials have been processed by the tool or if the tool has been used under lighter load only.

In some other applications the remote server 150 is arranged to store information relating to the construction equipment 100 and/or relating to the rotatable work tool 102, wherein the information is indexable by identification data stored by the wireless identification tag 110. This allows, e.g., a fleet operator to keep track of inventory by managing a set of digital twins corresponding to the work tools. The digital twins can be used to keep track of tool use, tool wear, and to determine appropriate service intervals.

The remote server 150 can also be arranged to determine a service interval associated with the construction equipment 100 and/or trigger rotatable work tool 102 replacement based on the data stored by the wireless identification tag 110, 1410.

Some applications comprise the remote server 150 being arranged to determine one or more statistics associated with the construction equipment 100 and/or with the rotatable work tool 102. These statistics can be used by a fleet operator or by a tool manufacturer for analysis and optimization of overall operations. The statistics can also be used as feedback for design of new tools and updates to existing products.

Some of the data reported from the wireless identification tag may be indicative of tool misuse by an operator. For instance, some operator or group of operators may experience increased occurrences of kickback conditions, or increased tool wear. This misuse can be detected, and training needs identified. Training can then be offered to identified operators or groups of operators. In other words, the remote server 150 is optionally arranged to determine a training need of an operator using the construction equipment based on the data stored by the wireless identification tag 110, 1410.

Figure 10:
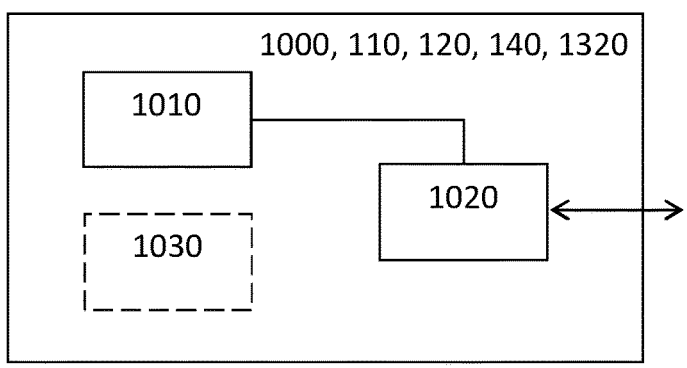
FIG. 10 shows an example control unit.

FIG. 10 schematically illustrates, in terms of a number of functional units, the general components of a control unit 140, or an identification circuit 1000, a tag 110 or a reader 120 according to embodiments of the discussions herein. Processing circuitry 1010 is provided using any combination of one or more of a suitable central processing unit CPU, multiprocessor, microcontroller, digital signal processor DSP, etc., capable of executing software instructions stored in a computer program product, e.g. in the form of a storage medium 1030. The processing circuitry 1010 may further be provided as at least one application specific integrated circuit ASIC, or field programmable gate array FPGA.

Particularly, the processing circuitry 1010 is configured to cause the device 110, 120, 140, 1000 to perform a set of operations, or steps, such as the methods discussed in connection to FIG. 6 and the discussions above. For example, the storage medium 1030 may store the set of operations, and the processing circuitry 1010 may be configured to retrieve the set of operations from the storage medium 1030 to cause the device to perform the set of operations. The set of operations may be provided as a set of executable instructions. Thus, the processing circuitry 1010 is thereby arranged to execute methods as herein disclosed.

The storage medium 1030 may also comprise persistent storage, which, for example, can be any single one or combination of magnetic memory, optical memory, solid state memory or even remotely mounted memory.

The device 110, 120, 140, 1000 may further comprise an interface 1020 for communications with at least one external device. As such the interface 1020 may comprise one or more transmitters and receivers, comprising analogue and digital components and a suitable number of ports for wireline or wireless communication.

The processing circuitry 1010 controls the general operation of the device 110, 120, 140, 1000, e.g., by sending data and control signals to the interface 1020 and the storage medium 1030, by receiving data and reports from the interface 1020, and by retrieving data and instructions from the storage medium 1030. In case of a tag or a reader, the interface comprises (or is connected via ports) to the inductive planar loops of either the tag 110 or the reader 120. Other components, as well as the related functionality, of the control node are omitted in order not to obscure the concepts presented herein.

Figure 11:
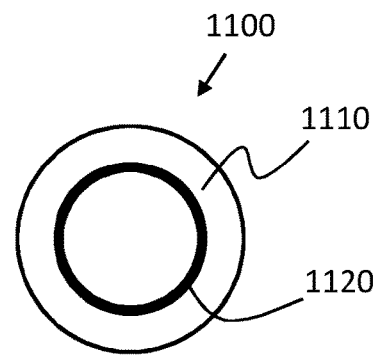
FIG. 11 illustrates a computer readable medium.

FIG. 11 illustrates a computer readable medium 1110 carrying a computer program comprising program code means 1120 for performing the methods illustrated in FIG. 6, when said program product is run on a computer. The computer readable medium and the code means may together form a computer program product 1100.

FIG. 14 shows construction equipment 1400 where a wireless identification tag 1410 has been embedded into the rotatable work too 102. However, this wireless identification tag comprises an inductive loop configured to harvest energy from a time varying magnetic flux generated by one or more permanent magnets 1420 arranged on the blade guard 103 of the construction equipment 1400. The wireless identification tag 1410 further comprises energy storage means and a radio frequency transceiver, by which it can communicate via wireless link 1430 with the control unit 140. Thus, the applications discussed above are possible to realize without a reader arranged in connection to the blade guard 103, such as the reader 120 shown in FIG. 1. The identification circuit 1000 discussed above can be used together with the wireless identification tag 1410 without modification, or with minor modifications.

According to an example, a diameter D of the wireless identification tag 1410 is between 10-40 mm, and preferably about 25 mm.

FIG. 14 shows a blade guard 103 comprising one or more permanent magnets 1420 arranged to power a wireless identification tag 1410 arranged embedded in a rotatable work tool 102. It is appreciated that, although FIG. 14 shows three magnets, any number of permanent magnets can be used, including a single permanent magnet.

FIG. 14 also shows a construction equipment 1400 comprising a wireless identification tag 1410, a blade guard 103 with one or more permanent magnets 1420, and a control unit 140 arranged to communicate with the wireless identification tag 1410 via radio link 1430.

Figure 15:
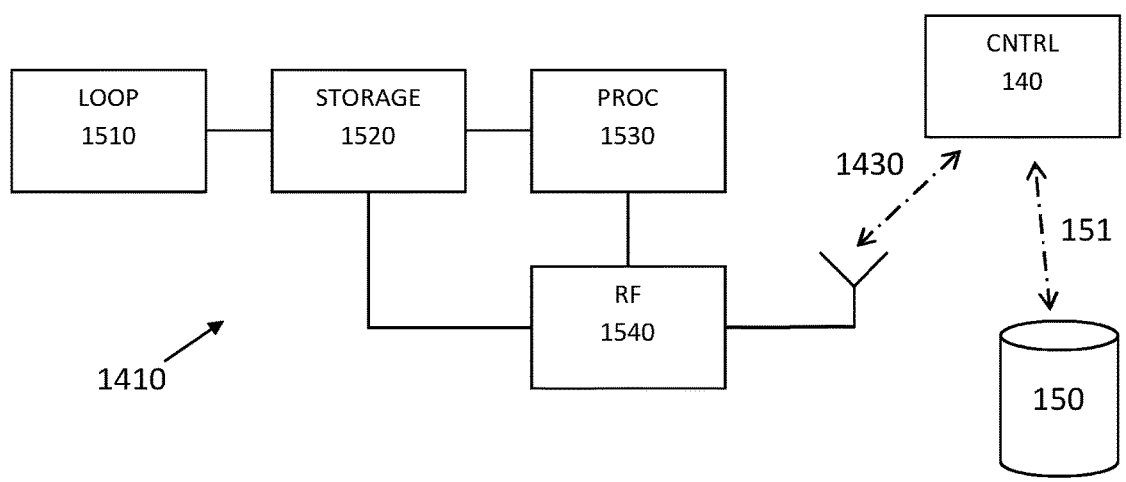
FIG. 15 schematically illustrates a wireless identification tag.

FIG. 15 schematically illustrates a wireless identification tag 1410 for embedding into a rotatable work tool 102. The tag comprises at least a first inductive loop 1510, an energy storage device 1520, processing circuitry 1530, and a radio frequency transceiver 1540. The wireless identification tag 1410 is arranged to harvest electrical energy from a time varying magnetic flux by the first inductive planar loop 1510 and to store the electrical energy in the energy storage device 1520. The processing circuitry 1530 and the radio frequency transceiver 1540 are arranged to be powered by the energy storage device 1520.

The control unit 140 is communicatively coupled 151 to the remote server 150 as discussed above.

FIG. 16 shows a work tool 1600 similar to the work tool in FIG. 1. However, in FIG. 16, the reader 120 is connected to a separate charging circuit 580 configured to harvest energy from one or more permanent magnets 1610 arranged on the work tool 102. The harvested energy may then be stored in an energy storage device 570 such as a rechargeable battery or capacitor. The one or more permanent magnets 1610 are arranged at a radial distance R' from a center of rotation C of the work tool 102. The radial distance R' is preferably different from the radial distance R so as to not interfere with the tag-reader inductive connection. However, the reader 120 may be arranged to detect passage of the one or more permanent magnets in order to synchronize operation. This is possible since there will be a fixed time duration between the permanent magnets 1610 passing the reader 120 and the wireless tag 110 passing the reader.

The invention claimed is:

1. A wireless identification tag for embedding into an electrically conductive surface of a rotatable work tool, the tag comprising at least a first inductive planar loop and a second inductive planar loop each having corresponding first and second terminals, wherein the first inductive planar loop and the second inductive planar loop are arranged in relation to a common plane and wherein the first inductive planar loop and the second inductive planar loop are arranged to cover different areas of the common plane, wherein each of the areas on the common plane is associated with a respective polarity of magnetic flux normal to the common plane, and wherein the first inductive planar loop is directed in an opposite direction from the second inductive planar loop relative to the corresponding first and second terminals.

2. The wireless identification tag according to claim 1, wherein the areas are separable by a line drawn on the common plane or by an arc of a circle having a radius drawn on the common plane.

3. The wireless identification tag according to claim 1, further comprising at least a third inductive planar loop, wherein each of the first, second and third inductive planar loops is arranged to cover a separate area of the common plane, wherein each separate area is associated with a respective polarity of the magnetic flux normal to the common plane.

4. The wireless identification tag according to claim 1, wherein at least one of the first inductive planar loop and the second inductive planar loop is a single turn inductive planar loop.

5. The wireless identification tag according to claim 1, wherein at least one of the first inductive planar loop and the second inductive planar loop is a multiple turn inductive planar loop.

6. The wireless identification tag according to claim 1, comprising a connecting network configured to serially connect the first and the second inductive planar loops, thereby increasing a total voltage induced by the first and the second inductive planar loops in response to changes in the magnetic flux.

7. The wireless identification tag according to claim 6, wherein the first and the second inductive planar loops are multiple turn inductive planar loops arranged serially connected and in a common plane.

8. The wireless identification tag according to claim 1, comprising a connecting network configured to connect the first and the second inductive planar loops in parallel, thereby reducing a source resistance associated with the wireless identification tag.

9. The wireless identification tag according to claim 1, comprising an identification circuit connected to the first inductive planar loop and to the second inductive planar loop, wherein the identification circuit is arranged to modulate a load on terminals of a circuit formed by connection of the first inductive planar loop and the second inductive planar loop, thereby providing an inductive communication channel to a wireless identification tag reader.

10. The wireless identification tag according to claim 9, wherein the identification circuit is arranged to be powered via the first and second inductive planar loops.

11. The wireless identification tag according to claim 9, wherein the identification circuit is arranged to store identification data comprising any of, unit identification number, tool dimension data, tool use specification, owner data, and authentication data.

12. The wireless identification tag according to claim 9, wherein the identification circuit is arranged to determine and to at least temporarily store any of; a temperature value, an acceleration value, a rotational velocity, accumulated tool use time, a kickback condition, a pre-kickback condition, forces acting on the tag, vibration experienced by the tag, and mechanical impact experienced by the wireless identification tag.

13. The wireless identification tag according to claim 9, wherein the identification circuit is arranged to determine an acceleration value.

14. A work tool comprising the wireless identification tag according to claim 1 embedded in a portion of the work tool.

15. The work tool according to claim 14, wherein the wireless identification tag is configured to rotate about a center of rotation during operation of the work tool.

16. The work tool according to claim 15, comprising a balancing hole configured to compensate for a weight imbalance with respect to the center of rotation in the work tool due to the embedded wireless identification tag.

17. The work tool according to claim 15, comprising one or more embedded permanent magnets configured in radial dependence of the embedded wireless identification tag.

18. The work tool according to claim 15, comprising a wire loop extending in a loop radially outwards on the rotatable work tool from the embedded wireless identification tag, wherein the embedded wireless identification tag is arranged to detect tool wear in case the wire loop is broken.

19. The work tool according to claim 15, wherein the wireless identification tag is arranged at a radial distance measured from a center of the work tool, wherein the radial distance is less than two thirds of a radius of the work tool.

20. The work tool according to claim 19, wherein the radial distance is greater than one third of the radius of the work tool.

21. A wireless identification tag system comprising a wireless identification tag and a wireless identification tag reader for reading data from the wireless identification tag when embedded into an electrically conductive surface of a rotatable work tool, the wireless identification tag reader comprising at least two inductive planar loops, of which at least one loop segment is positioned over a line defining separation of areas with magnetic flux of opposite polarities matching a separation line between areas of opposite flux polarities of inductive planar loops on the wireless identification tag, and wherein a first of the at least two inductive planar loops are directed in an opposite direction from a second of the at least two inductive planar loops relative to corresponding first and second terminals of the first and the second of the at least two inductive planar loops.

22. A rotatable work tool comprising a wireless identification tag,
wherein the wireless identification tag is arranged at a radial distance measured from a center of the work tool,
wherein the radial distance is less than two thirds of a radius of the work tool,
wherein a first inductive planar loop of the wireless identification tag is directed in an opposite direction from a second inductive planar loop of the wireless identification tag relative to corresponding first and second terminals of the first inductive planar loop and the second inductive planar loop, and
wherein the first inductive planar loop and the second inductive planar loop cover different areas of the wireless identification tag.

23. The rotatable work tool according to claim 22, wherein the radial distance is greater than one third of the radius of the work tool.

* * * * *